(12) United States Patent
Namuslu

(10) Patent No.: US 12,325,520 B2
(45) Date of Patent: Jun. 10, 2025

(54) AMMUNITION SUPPORT SYSTEM

(71) Applicant: TUSAS—TURK HAVACILIK VE UZAY SANAYII ANONIM SIRKETI, Kahramankazan/Ankara (TR)

(72) Inventor: Abdulkadir Namuslu, Kahramankazan/Ankara (TR)

(*) Notice: Subject to any disclaimer, the term of this patent is extended or adjusted under 35 U.S.C. 154(b) by 0 days.

(21) Appl. No.: 18/695,868

(22) PCT Filed: Sep. 21, 2022

(86) PCT No.: PCT/TR2022/051030
§ 371 (c)(1),
(2) Date: Mar. 27, 2024

(87) PCT Pub. No.: WO2023/055323
PCT Pub. Date: Apr. 6, 2023

(65) Prior Publication Data
US 2024/0391587 A1 Nov. 28, 2024

(30) Foreign Application Priority Data
Sep. 30, 2021 (TR) .............................. 2021/015266

(51) Int. Cl.
*B64D 1/04* (2006.01)
(52) U.S. Cl.
CPC ..................... *B64D 1/04* (2013.01)
(58) Field of Classification Search
CPC .............. B64D 1/06; B64D 1/04; B64D 1/02
USPC ........................................ 89/1.51; 244/137.4
See application file for complete search history.

(56) References Cited

U.S. PATENT DOCUMENTS

| | | | | |
|---|---|---|---|---|
| 3,670,620 A | * | 6/1972 | Paraskewik | B64D 1/04 294/82.26 |
| 3,752,034 A | * | 8/1973 | Waters | B64D 1/06 294/82.26 |
| 3,954,233 A | * | 5/1976 | Hasquenoph | B64D 7/08 244/137.4 |
| 4,196,879 A | * | 4/1980 | Craigie | B64D 7/08 89/1.53 |
| 4,233,883 A | * | 11/1980 | Miko | B64D 1/06 89/1.53 |
| 4,606,517 A | * | 8/1986 | Adams | B64D 1/06 294/82.26 |
| 5,904,323 A | * | 5/1999 | Jakubowski, Jr. | B64D 1/06 294/82.26 |

(Continued)

OTHER PUBLICATIONS

International Search Report and Written Opinion for PCT application No. PCT/TR2022/051030, mailed Feb. 28, 2023.

(Continued)

*Primary Examiner* — Joshua E Freeman
(74) *Attorney, Agent, or Firm* — Notaro, Michalos & Zaccaria P.C.

(57) ABSTRACT

The present invention relates to an ammunition (M) attached to the air vehicle for attacking its target; at least one body (2) on the air vehicle, which is a structural part; at least one sway brace (3) which contacts the ammunition (M) to support the ammunition (M); at least one rotating rod (4) located on the body (2) so as to rotate around an axis on which it is supported on the body (2), wherein the rotating rod (4) is rotated to allow the sway brace (3) to be moved.

15 Claims, 9 Drawing Sheets

(56) References Cited

U.S. PATENT DOCUMENTS

| | | | |
|---|---|---|---|
| 7,677,501 B1* | 3/2010 | Hundley | B64D 1/04 |
| | | | 294/82.26 |
| 10,518,883 B2* | 12/2019 | Lewendon | B64D 7/08 |
| 11,332,246 B2* | 5/2022 | Keller | B64D 1/06 |
| 11,459,102 B2* | 10/2022 | Keller | B64D 5/00 |
| 11,505,318 B2* | 11/2022 | Keller | B64D 1/06 |
| 2018/0281952 A1* | 10/2018 | Lewendon | B64D 7/08 |
| 2019/0039733 A1* | 2/2019 | Hayat | B64D 1/04 |
| 2020/0164982 A1* | 5/2020 | Keller | B64D 1/02 |
| 2020/0164984 A1* | 5/2020 | Keller | B64D 1/04 |
| 2020/0391866 A1* | 12/2020 | Keller | B64D 1/04 |
| 2021/0347478 A1* | 11/2021 | Akcay | B64D 1/04 |
| 2022/0363387 A1* | 11/2022 | Keller | B64D 1/04 |

OTHER PUBLICATIONS

Written Opinion of the International Preliminary Authority and Reply for PCT application No. PCT/TR2022/051030, mailed Aug. 25, 2023.

International Preliminary Examination Report for PCT application No. PCT/TR2022/051030, completed Oct. 16, 2023.

* cited by examiner

AMMUNITION SUPPORT SYSTEM

The present invention relates to an ammunition support system for supporting ammunition mounted on an air vehicle.

In air vehicles, ammunition support systems (sway brace) provide the ability to attach ammunition to the air vehicle and support the ammunition against aerodynamic forces, acceleration forces and/or vibration loads. In addition, the ability to attach different ammunitions of different diameters to the air vehicle in order to perform missions in different profiles with the same air vehicle provides an important power multiplier and cost efficiency for the users of the air vehicle.

U.S. Pat. No. 3,670,620, which is included in the known-state of the art, discloses an automatic sway brace device. Rotating a shaft opens or closes the distance between clamps. This causes a sway brace to be displaced symmetrically with respect to a rack part. By rotating a limiting nut, pre-stress is defined to the system. Moreover, a relative distance between sway braces and eyebolts supporting the ammunition is changed by means of turnbuckles. The sway braces supporting the ammunition are enabled to arc.

The other patent document US20200391866A1, which is included in the known-state of the art, discloses an aircraft and, more particularly, to container retention and release apparatus having integral swaybrace and retention features. The swaybrace and retention assembly includes a swaybrace arm having a receptacle to engage a post of a container. The swaybrace arm to pivot between the first position to cause the receptacle to engage the post of the container to retain the container and the second position to cause the receptacle to disengage the post to release the container.

The other patent document U.S. Pat. No. 7,677,501B1, which is included in the known-state of the art, discloses a system for releasing an article such as a munition or store from an aircraft. The system overcomes the above indicated shortcomings of the prior art by providing a deploying claw mechanism, which is driven out of the sway braces into the article being released and holds the article in place on the sway braces until it is finally released.

The other patent document U.S. Pat. No. 4,196,879A, which is included in the known-state of the art, discloses an ejector release units for use in aircraft for holding heavy stores in position beneath the aircraft and for subsequently releasing and ejecting the store. An ejector release unit comprising a pair of hooks for supporting a store and an ejection device for ejecting a store supported by the hooks also includes, adjacent each hook, a sway brace assembly comprising a pair of pads for engagement with the upper surface of a store supported by the hooks.

Thanks to an ammunition support system according to the present invention, ammunition of different diameters can be supported and attached to the air vehicle.

Another object of the present invention is to allow ammunition with a wide range of diameters to be attached to the air vehicle.

A further object of the present invention is to provide an effective and practical ammunition support system design which is easy to maintain and repair.

The ammunition support system realized to achieve the object of the invention, which is defined in the first claim and other claims dependent thereon, comprises an ammunition removably attached to the air vehicle for firing at its target; at least one body on the air vehicle, which is a structural part; at least one sway brace which contacts the ammunition on its outer surface, on at least one point thereof, to apply pressure to the ammunition, so that the ammunition is stabilized; at least one rotating rod which is provided on the body so as to rotate around a direction in which it is attached to the body, and which is rotated to enable the sway brace to be brought to different positions.

The ammunition support system according to the invention comprises at least one sway brace rod at a distance from the rotating rod predetermined by the user, which is located on the body so as to rotate around a direction in which it is attached to the body, wherein the sway brace is located on the sway brace rod, wherein the sway brace rod allows for removable attachment of different ammunition of different diameters to the body; at least one transmission rod for transmitting rotational movement of the rotating rod to the sway brace rod, which is located between the rotating rod and the sway brace rod so that one end thereof is supported on the rotating rod and the other end thereof on the sway brace rod.

In an embodiment of the invention, the ammunition support system comprises a center line which is almost parallel to a longitudinal axis of the air vehicle, extends longitudinally on the body, and bisects the body substantially in a symmetrical manner; a plane of symmetry located along the center line and bisecting the body symmetrically; a vertical plane parallel to the plane of symmetry and located at a distance from the plane of symmetry predetermined by the user; and the sway brace rod which is moved substantially in the vertical plane so that the sway brace is brought to the position in which its stability is ensured by contacting different ammunition of a wide range of diameters substantially on at least one point thereof.

In an embodiment of the invention, the ammunition support system comprises at least one adjusting tool which is an Allen or a screwdriver; at least one adjustment opening on the rotating rod, which is a channel integrated with the adjusting tool, wherein the adjusting tool can be attached or removed from the adjustment opening, wherein when the adjusting tool attached into the adjustment opening is rotated by an operator, the rotating rod is rotated, so that a position of the sway brace is changed.

In an embodiment of the invention, the ammunition support system comprises at least one drive shaft located on the rotating rod so as to extend outward from the rotating rod and rotate together with the rotating rod, wherein the drive shaft allows the operator to rotate the rotating rod by actuation through a single adjustment opening, enables the rotational movement to be transmitted to the rotating rod in mirror symmetry with respect to the plane of symmetry of the rotating rod, thus allowing the sway braces on both sides of the plane of symmetry to be moved through the single adjustment opening.

In an embodiment of the invention, the ammunition support system comprises the drive shaft substantially rectangular in cross-section, therefore allowing the transmission of movement from the rotating rod to the other rotating rod, which is mirror symmetric with respect to the plane of symmetry of the rotating rod, with relatively less stress values, wherein the drive shaft is form-compatible with the channel provided on the rotating rod, wherein the drive shaft allows for reduction of the stress concentration that occurs when the rotational movement is transmitted from one rotating rod to the other, since the corner points of the rectangular cross-section therein has a smooth transitional curved form.

In an embodiment of the invention, the ammunition support system comprises at least one locking member of a cam lever clamp type, which enables the sway brace to remain in the position in which it is stabilized by contacting different ammunitions of different diameters on at least one point, due to the frictional force caused by the operator tightening the rotating rod by rotating an adjusting portion of the cam lever clamp.

In an embodiment of the invention, the ammunition support system comprises the adjustment opening located on the rotating rod and on both sides of the plane of symmetry, thereby allowing the operator to move the rotating rod from any side.

In an embodiment of the invention, the ammunition support system comprises at least one stopper which is located on the body so as to extend outward from the body, which is conjugated with the rotating rod, and which allows the movement of the rotating rod to be limited.

In an embodiment of the invention, the ammunition support system comprises the screw-threaded sway brace; the screw-threaded sway brace rod form-compatible with the screw-threaded sway brace; at least one screw portion which changes the position of the sway braces on the sway brace rod by moving the adjusting tool that is removably attached thereto, thus changing the amount of pressure applied by the sway braces to the ammunition which are removably attached.

In an embodiment of the invention, the ammunition support system comprises a plurality of fasteners structurally connecting the rotating rod with the transmission rod, the transmission rod with the sway brace rod, and the sway brace rod with the body, wherein the fasteners are secured by insertion of a crown nut and a cotter pin.

In an embodiment of the invention, the ammunition support system comprises at least one flanged bushing located between the body and the rotating rod, which reduces the possible wear of the body over time, wherein the flanged bushing is replaced when the rotating rod wears out over time.

In an embodiment of the invention, the ammunition support system comprises a sensor that enables different ammunition diameter sizes to be obtained; a motor conjugated with the adjustment opening, which is attached to the adjustment opening and allows the rotating rod to be actuated without operator intervention; at least one control unit which enables the motor to be actuated according to the diameter data received from the sensor for different ammunition of different diameter sizes, and allows the rotating rod to be moved without operator intervention in order to bring the sway brace to the position predetermined by the user.

In an embodiment of the invention, the ammunition support system comprises the rotating rod attached to the body on both sides of the plane of symmetry as two separate parts, independent and separate from each other.

In an embodiment of the invention, the ammunition support system comprises the sway brace which is located on the sway brace rod at an angle predetermined by the user with respect to the plane of symmetry, so that the ammunition is supported on the outer surface thereof towards the geometric center of the ammunition, substantially parallel to the normal of the outer surface of the ammunition.

In an embodiment of the invention, the ammunition support system comprises the body on which the rotating rod, transmission rod and sway brace rod are located mirror symmetrically with respect to the plane of symmetry, in order for the sway braces to provide stability to the ammunition in mirror-symmetrical alignments with respect to the plane of symmetry on both sides of the plane of symmetry.

In an embodiment of the invention, the ammunition support system comprises an air vehicle, either an aircraft, an UAV, or a helicopter.

The ammunition support system realized to achieve the object of the present invention is illustrated in the attached drawings, in which.

Figure 1:
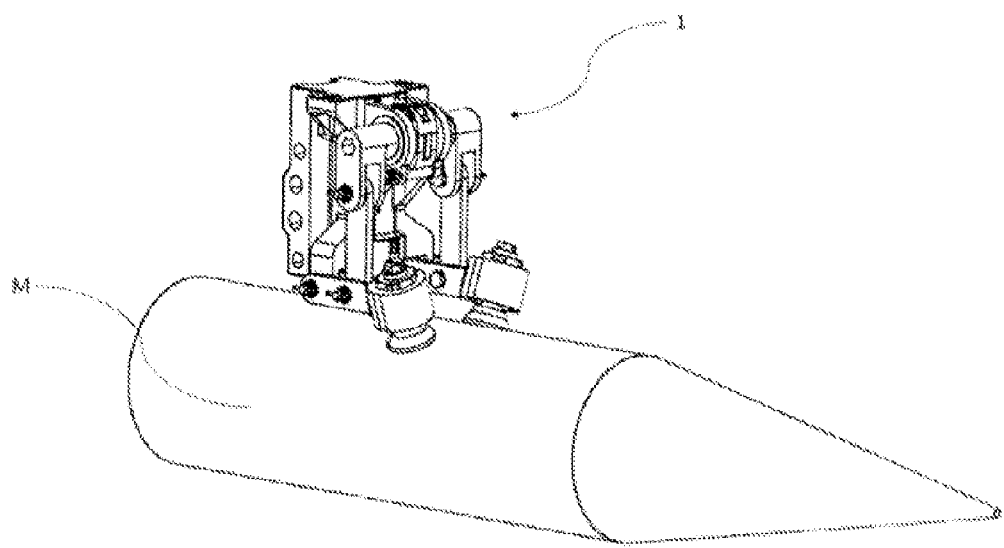
FIG. 1 is a perspective view of an ammunition support system.
Figure 9:
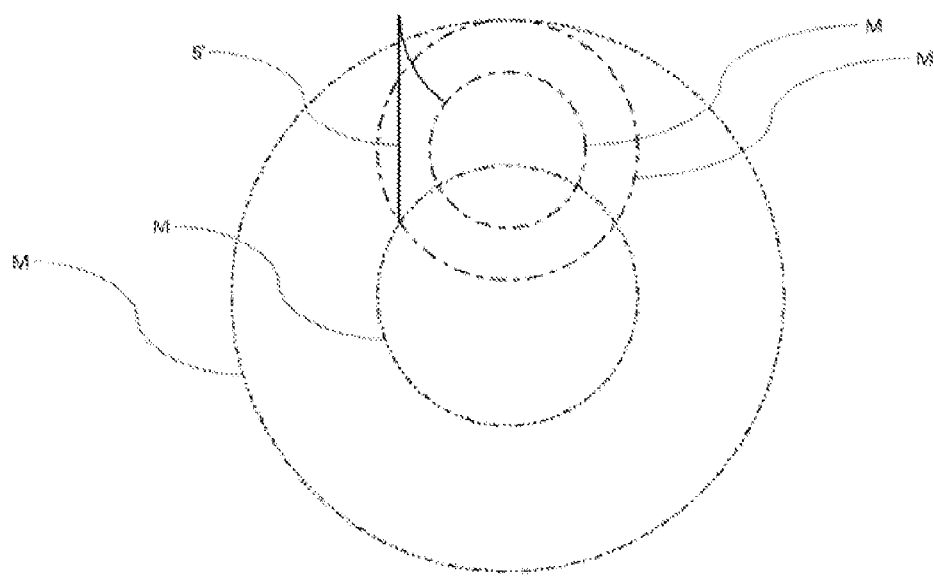
FIG. 9 is a schematic view of a vertical plane and alternative ammunition applications of different diameters that can be attached by a sway brace.

All the parts illustrated in figures are individually assigned a reference numeral and the corresponding terms of these numbers are listed below:
 1. Ammunition support system
 2. Body
 3. Sway brace
 4. Rotating rod
 5. Sway brace rod
 6. Transmission rod
 7. Adjustment opening
 8. Drive shaft
 9. Locking member
 10. Stopper
 11. Screw portion
 12. Fastener
 13. Flanged bushing
 14. Sensor
 15. Motor
 16. Control unit
 (M) Ammunition
 (A) Adjusting tool
 (BL) Center line
 (S) Plane of symmetry
 (S') Vertical plane The ammunition support system (1) comprises an ammunition (M) attached to the air vehicle for attacking its target; at least one body (2) on the air vehicle, which is a structural part; at least one sway brace (3) which contacts the ammunition (M) to support the ammunition (M); at least one rotating rod (4) located on the body (2) so as to rotate around an axis on which it is supported on the body (2), wherein the rotating rod (4) is rotated to allow the sway brace (3) to be moved (FIG. 1, FIG. 9).

The ammunition support system (1) according to the invention comprises at least one sway brace rod (5) at a distance from the rotating rod (4), which is located on the body (2) so as to rotate around an axis on which it is supported on the body (2), wherein the sway brace (3) is located on the sway brace rod (5), wherein the sway brace rod (5) allows for attachment of different ammunition (M) of different diameters to the body (2); at least one transmission rod (6) for transmitting movement of the rotating rod (4) to the sway brace rod (5), which is located between the rotating rod (4) and the sway brace rod (5) so that one end thereof is connected to the rotating rod (4) and the other end thereof to the sway brace rod (5) (FIG. 1, FIG. 2, FIG. 3, FIG. 4, FIG. 9).

Figure 2:
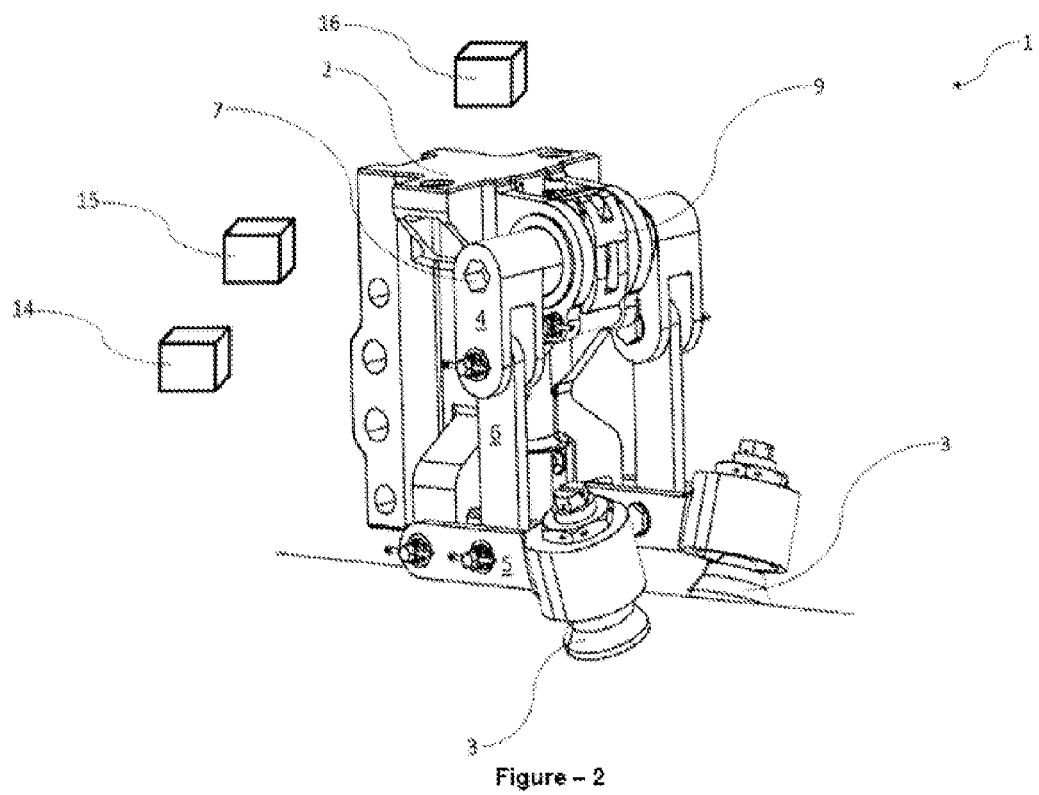
FIG. 2 is a perspective view of an ammunition support system.

The ammunition support system (1) supports the ammunition (M) by applying pressure to the ammunition (M) against various vibration loads that the air vehicle and the ammunition (M) are exposed to during flight, the acceleration loads that occur in different maneuvers of the air vehicle and various aerodynamic loads caused by the air flow. The ability to attach different ammunitions (M) of different diameters to the air vehicle provides flexibility for different operations and also contributes to the cost-effectiveness of the air vehicle. A position of the sway brace (3) can be changed by the user by rotating the rotating rod (4) around its own axis by means of a tool such as an Allen or a screwdriver, and transferring said movement to the sway brace (3) with various mechanisms. These mechanisms can generally be those using a gear and a cam piece. By changing the position of the sway brace (3) so that the sway brace (3) arcs, the sway brace (3) is brought to a position that will enable the sway brace (3) to support different ammunitions (M) of different diameters (FIG. 1, FIG. 2, FIG. 9).

The position of the sway brace (3) can be adjusted for different ammunition (M) of different diameters. Thanks to the adaptation of the four-rod mechanism, which consists of the body (2), the rotating rod (4), the sway brace rod (5) and the transmission rod (6), to the ammunition support mechanism, there is provided an effective, relatively simple, low-cost ammunition support mechanism (1) which is less likely to fall, relatively easy to maintain, and allows the positions of the sway brace (3) to be changed quickly and effectively (FIG. 1, FIG. 2, FIG. 3, FIG. 9).

In an embodiment of the invention, the ammunition support system (1) comprises a center line (BL) which is substantially parallel to a longitudinal axis of the air vehicle, extends longitudinally on the body (2), and bisects the body (2) symmetrically; a plane of symmetry (S) located along the center line (BL) and bisecting the body (2) symmetrically; a vertical plane (S') parallel to the plane of symmetry (S) and located at a distance from the plane of symmetry (S) predetermined by the user; and the sway brace rod (5) which is moved substantially in the vertical plane (S') so that the sway brace (3) is brought to the position in which the sway brace (3) substantially contacts and supports different ammunition (M) of a wide range of diameters. Therefore, instead of bringing the sway brace (3) to different positions by arcing, position of the sway brace (3) is changed only on the vertical plane (S'), such that position of the sway brace (3) is substantially changed only in the vertical plane (S') when the air vehicle is viewed from the opposite side, thus allowing for attachment of different ammunitions (M) of much wider diameter ranges to the ammunition support system (1) (FIG. 2, FIG. 5, FIG. 6, FIG. 9).

Figure 8:
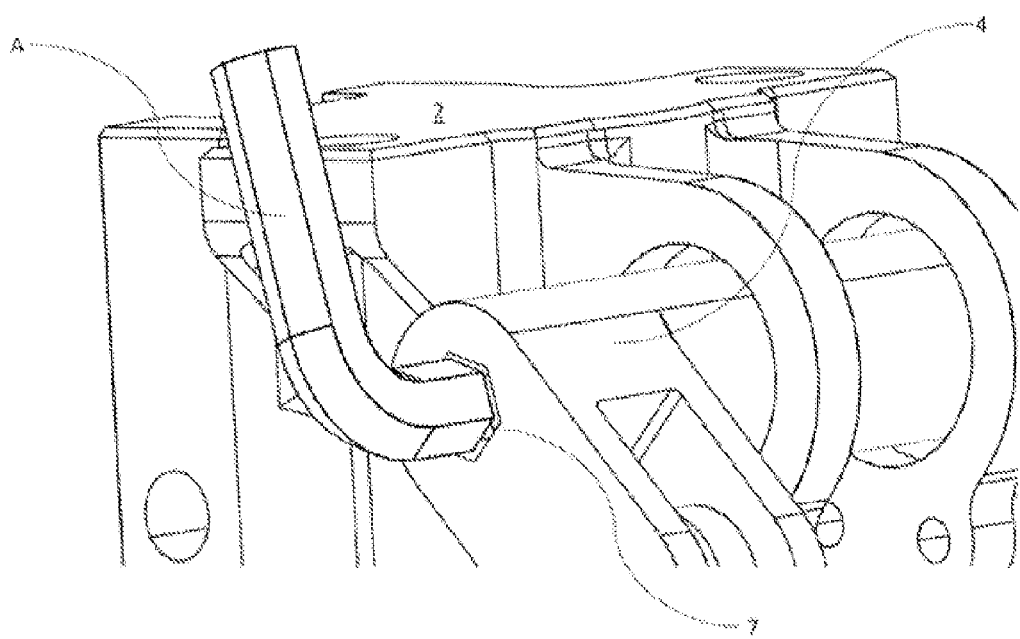
FIG. 8 is a perspective view of a rotating rod and adjusting tool.

In an embodiment of the invention, the ammunition support system (1) comprises an adjusting tool (A) which is an Allen or a screwdriver; at least one adjustment opening (7) on the rotating rod (4), which is a channel conjugated with the adjusting tool (A) such that the adjusting tool (A) can be attached or removed, wherein when the adjusting tool (A) attached on the adjustment opening (7) is rotated by an operator, the rotating rod (4) is rotated, so that position of the sway brace (3) is changed. The adjusting tool (A), which is attached to the adjustment opening (7), is rotated by the operator to ensure the rotation of the rotating rod (4) and movement is provided to the entire ammunition support system (1) (FIG. 2, FIG. 8).

Figure 5:
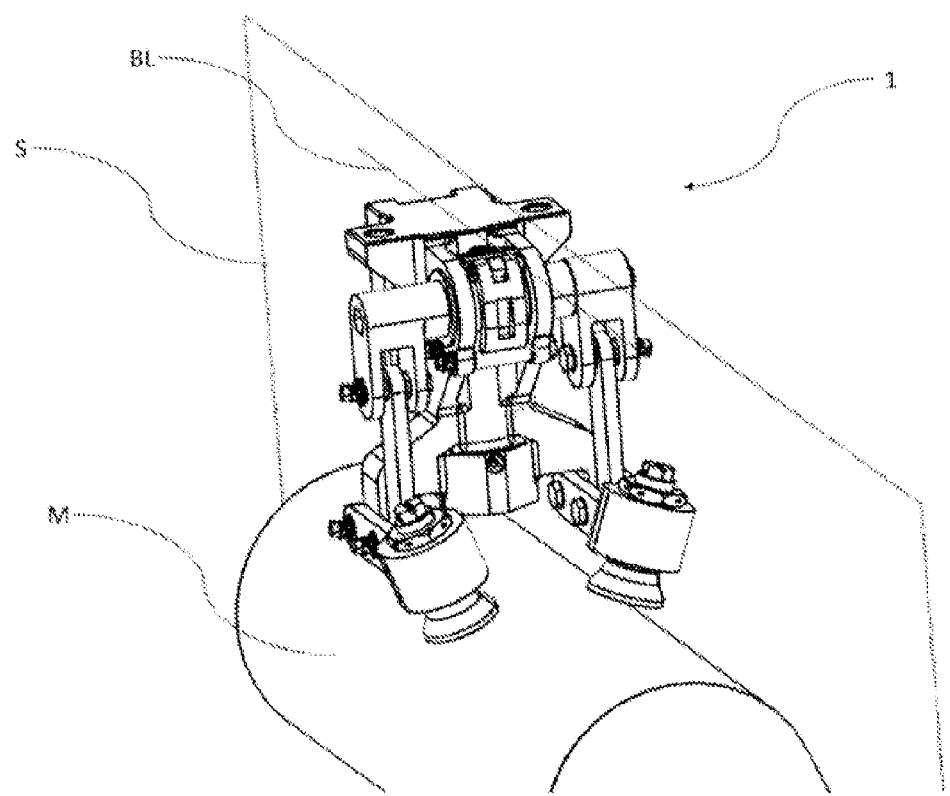
FIG. 5 is a perspective view of an ammunition support system.
Figure 7:
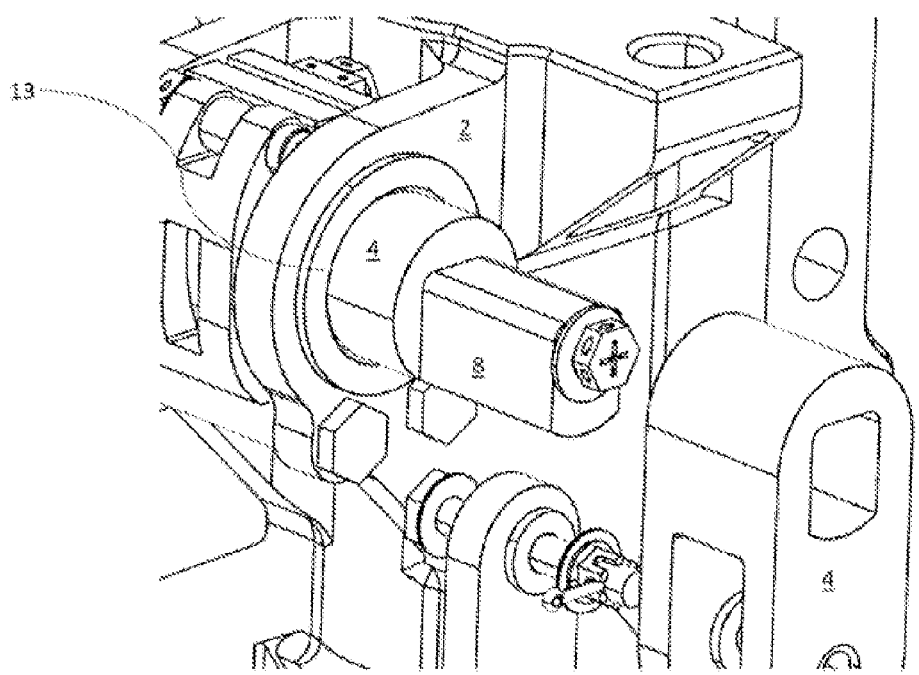
FIG. 7 is a perspective view of a drive shaft.

In an embodiment of the invention, the ammunition support system (1) comprises at least one drive shaft (8) located on the rotating rod (4) so as to extend outward from the rotating rod (4) and rotate together with the rotating rod (4), wherein the drive shaft (8) allows for transmission of the rotational movement, which is provided by the operator to the rotating rod (4) through the single adjustment opening (7), to a rotating rod (4) which is in mirror symmetry with respect to the plane of symmetry (S) of the rotating rod (4), thus allowing the sway braces (3) on both sides of the plane of symmetry (S) to be moved through the single adjustment opening (7). The rotational movement of the rotating rod (4) is transferred to the other rotating rod (4), which is in mirror symmetry with respect to the plane of symmetry (S), by means of the drive shaft (8). In addition, removable mounting of the other rotating rod (4), which is in mirror symmetry with respect to the plane of symmetry (S) of the rotating rod (4), to the body (2) provides convenience in terms of mounting the ammunition support system (1). In case of failure of the rotating rod (4), which is removably attached to the body (2) as two separate parts on both sides of the plane of symmetry (S) and thus located on one side of the plane of symmetry (S), only the failed rotating rod (4) is replaced, so that easy maintenance is provided with low-cost (FIG. 2, FIG. 5, FIG. 7).

In an embodiment of the invention, the ammunition support system (1) comprises the drive shaft (8) substantially having a rectangular profile, therefore allowing the transmission of movement from the rotating rod (4) to the other rotating rod (4), which is mirror symmetric with respect to the plane of symmetry (S) of the rotating rod (4), with low stress, wherein the drive shaft (8) is form-compatible with the channel provided on the rotating rod (4), wherein the drive shaft (8) allows for reduction of the stress concentration that occurs when the rotational movement is transmitted from one rotating rod (4) to the other rotating rod (4), thanks to the radius form of the rectangular profile corners thereof. Therefore, a design that is resistant to fatigue is provided for the movement transfer from one rotating rod (4) to the other rotating rod (4), as well as providing easy assembly of the rotating rods (4) to each other (FIG. 7).

Figure 3:
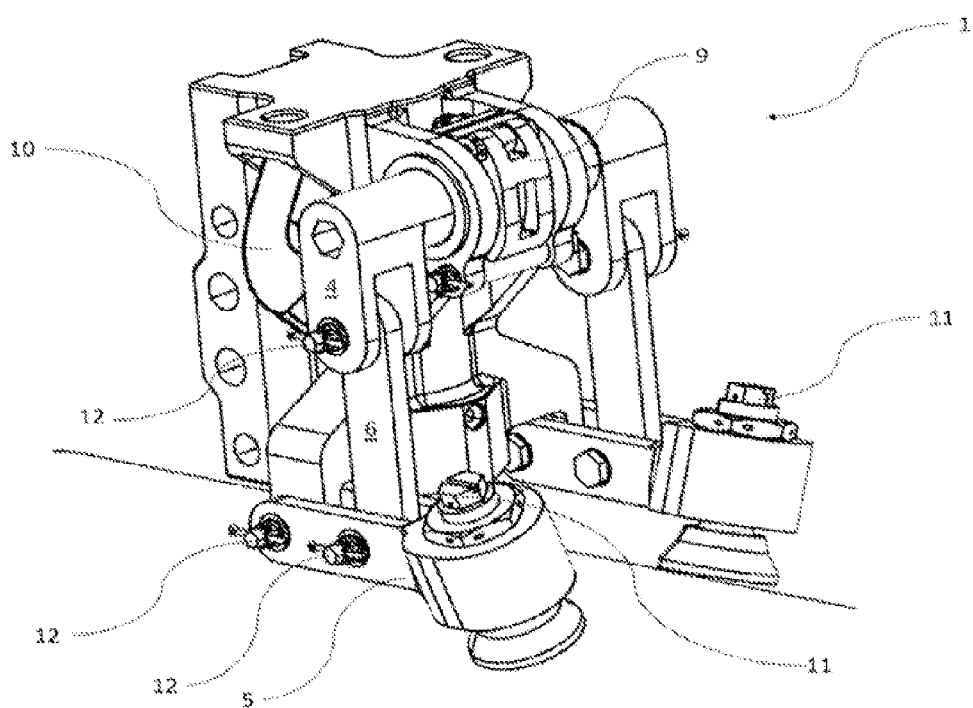
FIG. 3 is a perspective view of an ammunition support system.

In an embodiment of the invention, the ammunition support system (1) comprises at least one locking member (9) which is a cam lever clamp and allows the sway brace (3) to be fixed in the position that the sway brace (3) supports different ammunition (M) of different diameters by contacting, when the operator rotates the cam lever clamp to compress the rotating rod (4). After the rotating rod (4) is brought to the desired position, the technician rotates the locking member (9), e.g. the cam lever clamp, to tighten the rotating rod (4), thus ensuring that the rotating rod (4) is fixed in the desired position (FIG. 1, FIG. 2, FIG. 3).

Figure 4:
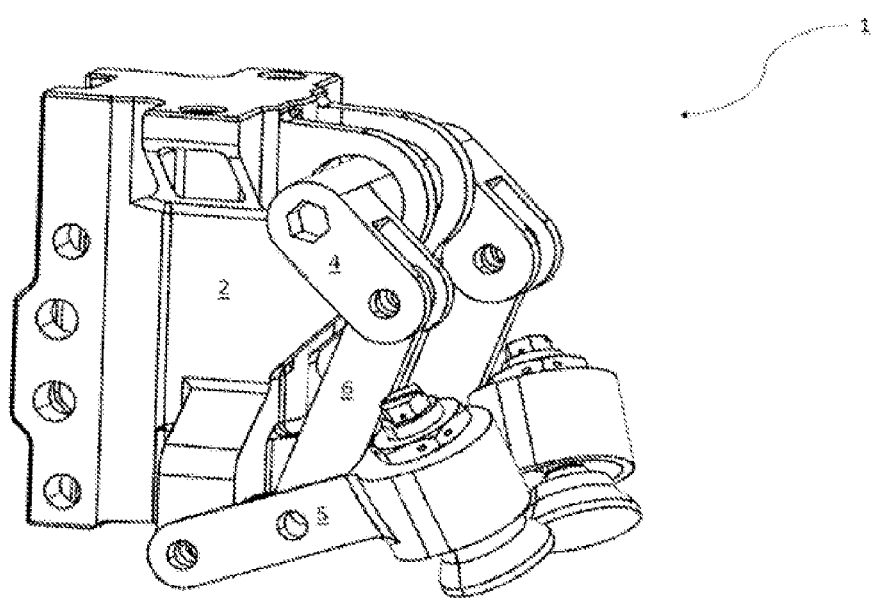
FIG. 4 is a perspective view of an ammunition support system.

In an embodiment of the invention, the ammunition support system (1) comprises the adjustment opening (7) which allows the operator to rotate the rotating rod (4) at a desired side since the adjustment opening is located on the rotating rod (4) and on both sides of the plane of symmetry (S). Therefore, in cases where ground maintenance equipment prevents access to the adjustment opening (7) on one side of the plane of symmetry (S), the technician can change positions of the sway brace (3) by rotating the rotating rod (4) located on the other side of the plane of symmetry (S). If an asymmetric ammunition (M) is desired to be attached to the ammunition support system (1) as part of design requirements, it can also ensure that the sway braces (3) located on both sides of the plane of symmetry (S) are brought to different positions by rotating the rotating rods (4) located on both sides of the plane of symmetry (S) by different amounts (FIG. 2, FIG. 4, FIG. 5).

In an embodiment of the invention, the ammunition support system (1) comprises at least one stopper (10) located on the body (2) so as to extend outward from the body (2), which is form-compatible with the rotating rod (4) and allows the movement of the rotating rod to be restricted. Thus, the angular range in which the rotating rod (4) can rotate is limited (FIG. 2, FIG. 3).

In an embodiment of the invention, the ammunition support system (1) comprises the screw-threaded sway brace (3); the screw-threaded sway brace rod (5) form-compatible with the screw-threaded sway brace (3); at least one screw portion (11) which changes the position of the sway braces (3) on the sway brace rod (5) by rotating the adjusting tool (A) that is attached thereto, thus changing the amount of support applied by the sway braces (3) to the ammunition (M). The sway brace (3) can be adjusted at the screw portion (11) by a screwdriver or a wrench, thus the screw portion (11) facilitates the adjustment process even when technicians have limited equipment. The adjustment of the sway braces (3) performed at the screw part (11) allows the pre-tension of the Belleville springs inside the sway braces (3) to be adjusted. For different types of ammunition (M) of different diameters, the aforementioned pre-stress adjustment process is performed once before the ammunition (M) is inserted (FIG. 2, FIG. 3, FIG. 8).

In an embodiment of the invention, the ammunition support system (1) comprises a plurality of fasteners (12) connecting the rotating rod (4) with the transmission rod (6), the transmission rod (6) with the sway brace rod (5), and the sway brace rod (5) with the body (2), wherein the fasteners (12) are secured by a crown nut and a cotter pin. By securing the fastener (12) by means of the crown nut and the cotter pin, the nut on the fasteners (12) is prevented from loosening under the vibration loads that the air vehicle will be exposed to. In addition, the possible weakening of the fastener (12) nut that may occur over time is eliminated (FIG. 3).

In an embodiment of the invention, the ammunition support system (1) comprises at least one flanged bushing (13) located between the body (2) and the rotating rod (4), which prevents wear of the body (2), wherein the flanged bushing (13) is replaced due to the wear of the rotating rod (4). The flanged bushings (13) are replaced over time, without damaging the components provided in the ammunition support system (1), by replacing the flanged bushings (13) with new ones which are relatively cheaper and easier to manufacture, so that the ammunition support system (1) maintains its operation with a cost-effective and fast maintenance (FIG. 3, FIG. 7).

In an embodiment of the invention, the ammunition support system (1) comprises a sensor (14) that enables different ammunition (M) diameters to be measured; a motor (15) form-compatible with the adjustment opening (7), which is removably attached to the adjustment opening (7) and allows the rotating rod (4) to be actuated automatically; at least one control unit (16) which enables the motor (15) to be triggered according to the diameter size for different ammunitions (M) of different diameters received from the sensor (14), and allows the rotating rod (4) to be rotated automatically in order to bring the sway brace (3) to the position predetermined by the user (FIG. 1, FIG. 2). Thus, the system can operate in a fully automated manner without the need for a technician (FIG. 1, FIG. 2).

In an embodiment of the invention, the ammunition support system (1) comprises the rotating rod (4), which is removably attached to the body (2) as two separate parts, on both sides of the plane of symmetry (S). Therefore, in case the rotating rod (4) fails and needs to be replaced, instead of replacing the whole rotating rod (4), repairing only the failed rotating rod which is located on one side of the plane of symmetry (S) and removably attached to the body (2) will enable the ammunition support system (1) to re-operate (FIG. 2, FIG. 5).

In an embodiment of the invention, the ammunition support system (1) comprises the sway brace (3) which is located on the sway brace rod (5) at an angle predetermined by the user with respect to the plane of symmetry (S), so that the ammunition (M) is supported on the outer surface thereof substantially in a vertical direction. The sway brace (3) is located on the sway brace rod (5) at an angle determined by the user with respect to the plane of symmetry (S) in order to bring different ammunitions (M) of different diameters into contact with its outer surface substantially in a vertical direction, and the position of the sway brace (3) can be changed by the user by means of the rotating rod (4). Thus, the sway braces (3) apply pressure to different ammunition (M) of different diameters substantially towards the geometric center of the ammunition (M) (FIG. 1, FIG. 2, FIG. 4, FIG. 5, FIG. 6).

Figure 6:
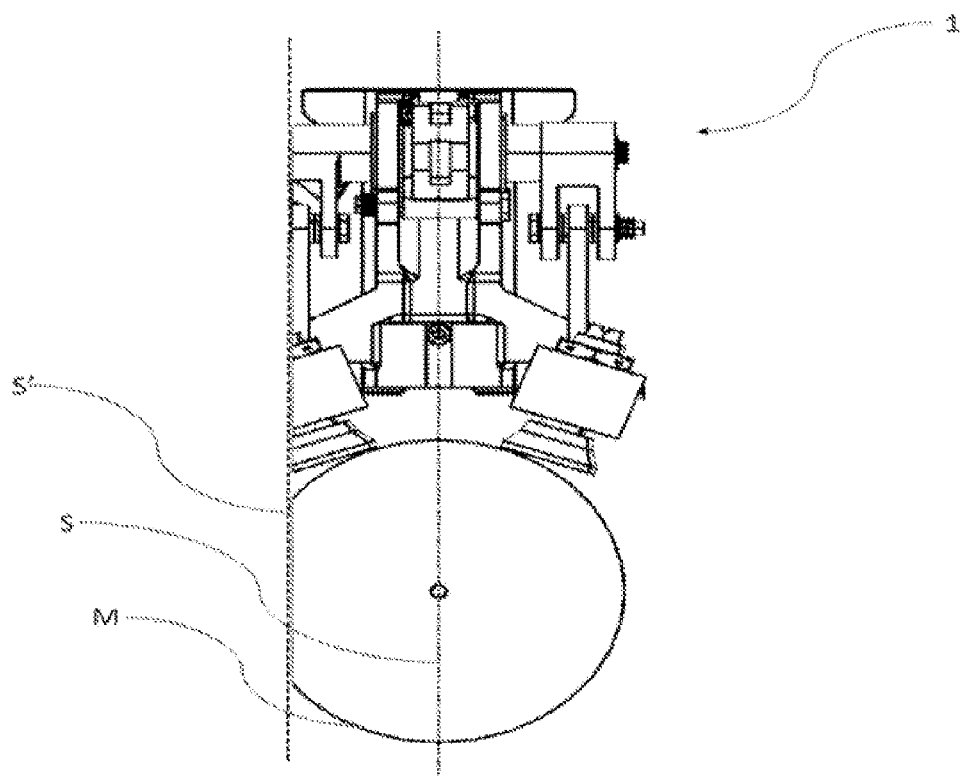
FIG. 6 is a front view of an ammunition support system.

In an embodiment of the invention, the ammunition support system (1) comprises the body (2) on which the rotating rod (4), transmission rod (6) and sway brace rod (5) are located substantially mirror symmetrically with respect to the plane of symmetry (S), in order for the sway braces (3) to support the ammunition (M) on both sides of the plane of symmetry (S) in mirror-symmetrical directions with respect to the plane of symmetry (S) (FIG. 2, FIG. 6).

The invention claimed is:

1. An ammunition support system (1) for an ammunition (M) attached to an air vehicle for attacking a target; comprising:
   at least one body (2) on the air vehicle which is a structural part;
   at least one sway brace (3) which contacts the ammunition (M) to support the ammunition (M);
   at least one rotating rod (4) located on the body (2) so as to rotate around an axis on which it is supported on the body (2), wherein the rotating rod (4) is rotated to allow the sway brace (3) to be moved;
   at least one sway brace rod (5) at a distance from the rotating rod (4), which is located on the body (2) so as to rotate around an axis on which it is supported on the body (2), wherein the sway brace (3) is located on the sway brace rod (5), wherein the sway brace rod (5) allows for attachment of different ammunition (M) of different outer diameters to the body (2); and
   at least one transmission rod (6) for transmitting movement of the rotating rod (4) to the sway brace rod (5), which is located between the rotating rod (4) and the sway brace rod (5) so that one end thereof is connected to the rotating rod (4) and the other end thereof to the sway brace rod (5).

2. The ammunition support system (1) according to claim 1, comprising:
   a center line (BL) which is substantially parallel to a longitudinal axis of the air vehicle, extends longitudinally on the body (2), and bisects the body (2) symmetrically;
   a plane of symmetry (S) located along the center line (BL) and bisecting the body (2) symmetrically;

a vertical plane (S') parallel to the plane of symmetry (S) and located at a distance from the plane of symmetry (S) predetermined by the user;

more than one sway brace (3) located on both sides of the symmetry plane(S); and sway brace rods (5) which are moved substantially in the vertical plane (S') so that the sway braces (3) are brought to the position in which the sway braces (3) substantially contact and support different ammunition (M).

3. The ammunition support system (1) according to claim 2, wherein the rotating rod (4) is removably attached to the body (2) as two separate parts on both sides of the plane of symmetry (S).

4. The ammunition support system (1) according to claim 2, wherein the sway brace (3) is located on the sway brace rod (5) at an angle predetermined by the user with respect to the plane of symmetry (S) so that the ammunition (M) is supported on the outer surface thereof substantially in a vertical direction.

5. The ammunition support system (1) according to claim 2, wherein the body (2) on which the rotating rod (4), transmission rod (6) and sway brace rod (5) are located substantially mirror symmetrically with respect to the plane of symmetry (S), in order for the sway brace (3) to support the ammunition (M) on both sides of the plane of symmetry (S) in mirror-symmetrical directions with respect to the plane of symmetry (S).

6. The ammunition support system (1) according to claim 1, comprising:

an adjusting tool (A) which is an Allen or a screwdriver; and at least one adjustment opening (7) on the rotating rod (4), which is a channel conjugated with the adjusting tool (A) such that the adjusting tool (A) can be attached or removed, wherein when the adjusting tool (A) attached on the adjustment opening (7) is rotated by an operator, the rotating rod (4) is rotated, so that position of the sway brace (3) is changed.

7. The ammunition support system (1) according to claim 6, comprising at least one drive shaft (8) located on the rotating rod (4) so as to extend outward from the rotating rod (4) and rotate together with the rotating rod (4), wherein the drive shaft (8) allows for transmission of the rotational movement, which is provided by the operator to the rotating rod (4) through the single adjustment opening (7), to a rotating rod (4) which is in mirror symmetry with respect to the plane of symmetry (S) of the rotating rod (4), thus allowing the sway brace (3) on both sides of the plane of symmetry (S) to be moved through the single adjustment opening (7).

8. The ammunition support system (1) according to claim 7, wherein the drive shaft (8) has a substantially rectangular profile, therefore allowing the transmission of movement from the rotating rod (4) to the other rotating rod (4), which is mirror symmetric with respect to the plane of symmetry (S) of the rotating rod (4), with low stress, wherein the drive shaft (8) is form-compatible with the channel provided on the rotating rod (4), wherein the drive shaft (8) allows for reduction of the stress concentration that occurs when the rotational movement is transmitted from one rotating rod (4) to the other rotating rod (4) because of the radius form of the rectangular profile corners thereof.

9. The ammunition support system (1) according to claim 1, comprising at least one locking member (9) which is a cam lever clamp and allows the sway brace (3) to be fixed in the position that the sway brace (3) supports different ammunition (M) of different diameters by contacting, when the operator rotates the cam lever clamp to compress the rotating rod (4).

10. The ammunition support system (1) according to claim 6, wherein the adjustment opening (7) allows the operator to rotate the rotating rod (4) at a desired side because the adjustment opening (7) is located on the rotating rod (4) and on both sides of the plane of symmetry (S).

11. The ammunition support system (1) according to claim 1, comprising at least one stopper (10) located on the body (2) so as to extend outward from the body (2) and which is form-compatible with the rotating rod (4) and allows the movement of the rotating rod to be restricted.

12. The ammunition support system (1) according to claim 6, wherein the sway brace (3) has a screw threaded on it; wherein the sway brace rod (5) having a screw threaded that is form-compatible with the screw-threaded sway brace (3); and further comprising at least one screw portion (11) which changes a position of the sway brace (3) on the sway brace rod (5) by rotating the adjusting tool (A) that is attached thereto, thus changing an amount of support applied by the sway brace (3) to the ammunition (M).

13. The ammunition support system (1) according to claim 1, comprising a plurality of fasteners (12) connecting the rotating rod (4) with the transmission rod (6), the transmission rod (6) with the sway brace rod (5), and the sway brace rod (5) with the body (2), wherein the fasteners (12) are secured by a crown nut and a cotter pin.

14. The ammunition support system (1) according to claim 1, comprising at least one flanged bushing (13) located between the body (2) and the rotating rod (4) which prevents wear of the body (2), wherein the flanged bushing (13) is replaced due to the wear of the rotating rod (4).

15. The ammunition support system (1) according to claim 6, comprising:

a sensor (14) that enables different ammunition (M) diameters to be measured;

a motor (15) form-compatible with the adjustment opening (7), which is removably attached to the adjustment opening (7) and allows the rotating rod (4) to be actuated automatically; and at least one control unit (16) which enables the motor (15) to be triggered according to the diameter size for different ammunitions (M) of different diameters received from the sensor (14), and allows the rotating rod (4) to be rotated automatically in order to bring the sway brace (3) to the position predetermined by the user.

* * * * *